(12) United States Patent  (10) Patent No.: US 8,469,123 B1
Knickerbocker  (45) Date of Patent: Jun. 25, 2013

(54) ELECTRIC VEHICLE WITH ENERGY PRODUCING SYSTEM AND METHOD OF USING THE SAME

(76) Inventor: Cecil G. Knickerbocker, Las Vegas, NV (US)

( * ) Notice: Subject to any disclaimer, the term of this patent is extended or adjusted under 35 U.S.C. 154(b) by 0 days.

(21) Appl. No.: 13/484,675

(22) Filed: May 31, 2012

Related U.S. Application Data

(62) Division of application No. 13/325,336, filed on Dec. 14, 2011, now Pat. No. 8,220,570.

(51) Int. Cl.
*B60K 16/00* (2006.01)

(52) U.S. Cl.
CPC .................................... *B60K 16/00* (2013.01)
USPC ............................... 180/2.2; 180/2.1; 180/165

(58) Field of Classification Search
CPC ...................................................... B60K 16/00
USPC ................... 180/2.1, 2.2, 65.31, 165
See application file for complete search history.

(56) References Cited

U.S. PATENT DOCUMENTS

| | | |
|---|---|---|
| 1,198,501 A | 9/1916 | Wintermute |
| 3,444,946 A | 5/1969 | Waterbury |
| 3,556,239 A | 1/1971 | Spahn |
| 3,876,925 A | 4/1975 | Stoeckert |
| 3,878,913 A | 4/1975 | Lionts et al. |
| 4,075,545 A | 2/1978 | Haberer |
| 4,132,282 A | 1/1979 | Sparks |
| 4,141,425 A | 2/1979 | Treat |
| 4,168,759 A | 9/1979 | Hull et al. |
| 4,254,843 A | 3/1981 | Han et al. |
| 4,314,160 A | 2/1982 | Boodman et al. |
| 4,360,751 A | 11/1982 | Arnold et al. |
| 4,423,368 A | 12/1983 | Bussiere |
| 4,504,751 A | 3/1985 | Meier |
| 4,953,811 A | 9/1990 | Smith |
| 5,005,353 A | 4/1991 | Acton et al. |
| 5,141,173 A | 8/1992 | Lay |
| 5,280,827 A | 1/1994 | Taylor et al. |
| 5,287,004 A | 2/1994 | Finley |
| 5,296,746 A | 3/1994 | Burkhardt |
| 5,386,146 A | 1/1995 | Hickey |
| 5,680,032 A | 10/1997 | Pena |
| 5,746,283 A | 5/1998 | Brighton |
| 5,760,515 A | 6/1998 | Burns |
| 5,844,324 A | 12/1998 | Spriggle |
| 5,920,127 A | 7/1999 | Damron et al. |
| 5,962,942 A | 10/1999 | Pullen et al. |
| 6,138,781 A | 10/2000 | Hakala |

(Continued)

FOREIGN PATENT DOCUMENTS

| | | |
|---|---|---|
| GB | 2299223 A | 9/1996 |
| JP | 2008-190518 A | 8/2008 |

*Primary Examiner* — John R Olszewski
*Assistant Examiner* — Jacob Meyer
(74) *Attorney, Agent, or Firm* — Greenberg Traurig

(57) ABSTRACT

An energy-producing system comprising an axle configured to be driven by an electric vehicle's wheels when in motion. The axle supports a series of wind-catching cups contained within an aerodynamic housing configured to direct air to the cups while also increasing the air speed. During vehicle motion, the cups are acted upon by rushing air causing the rotation of the axle such that the rotation may be transferred into energy via a generator/alternator linked thereto. A series of similarly polarized magnets integrated on said cups and proximate thereto further maintain the axle in motion during short vehicle stops. The system extends the life of the batteries between charges as well the distance the vehicle can travel between charges.

8 Claims, 7 Drawing Sheets

U.S. PATENT DOCUMENTS

| | | |
|---|---|---|
| 6,194,798 B1 | 2/2001 | Lopatinsky |
| 6,857,492 B1 | 2/2005 | Liskey et al. |
| 6,897,575 B1 | 5/2005 | Yu |
| 7,147,069 B2 | 12/2006 | Maberry |
| 7,147,438 B2 | 12/2006 | DePaoli |
| 7,423,405 B2 | 9/2008 | Okai et al. |
| 7,445,064 B2 | 11/2008 | Kim |
| 7,514,803 B2 | 4/2009 | Wilks |
| 7,547,983 B2 | 6/2009 | Sabella |
| 7,808,121 B1 | 10/2010 | Glynn |
| 7,868,476 B2 | 1/2011 | Baca et al. |
| 8,083,557 B2 | 12/2011 | Sullivan |
| 2001/0011825 A1 | 8/2001 | De Vega |
| 2002/0066608 A1 | 6/2002 | Guenard et al. |
| 2002/0153178 A1 | 10/2002 | Limonius |
| 2003/0030348 A1 | 2/2003 | Lopatinsky et al. |
| 2003/0132638 A1 | 7/2003 | Simonsen |
| 2003/0155464 A1 | 8/2003 | Tseng |
| 2003/0209370 A1 | 11/2003 | Maberry |
| 2004/0012205 A1 | 1/2004 | Sua-An |
| 2004/0206554 A1 | 10/2004 | McCabe |
| 2005/0098361 A1 | 5/2005 | Mitchell |
| 2005/0103537 A1 | 5/2005 | Michaud et al. |
| 2005/0280664 A1 | 12/2005 | DePaoli |
| 2006/0113118 A1 | 6/2006 | Kim |
| 2006/0138889 A1 | 6/2006 | Godfrey |
| 2006/0197394 A1 | 9/2006 | Applegate |
| 2006/0213697 A1 | 9/2006 | Sutherland |
| 2006/0254255 A1 | 11/2006 | Okai |
| 2006/0272863 A1 | 12/2006 | Donahue |
| 2006/0278445 A1 | 12/2006 | Chang |
| 2007/0039764 A1 | 2/2007 | McBryde |
| 2007/0051542 A1 | 3/2007 | Wilks |
| 2007/0085435 A1 | 4/2007 | Godfrey |
| 2007/0107949 A1 | 5/2007 | Bradley et al. |
| 2007/0222318 A1 | 9/2007 | Godfrey |
| 2007/0284155 A1 | 12/2007 | Cong |
| 2008/0011523 A1 | 1/2008 | Packard |
| 2008/0017423 A1 | 1/2008 | Gasendo |
| 2008/0120980 A1 | 5/2008 | Gemin et al. |
| 2008/0284169 A1 | 11/2008 | Sabella |
| 2008/0296907 A1 | 12/2008 | Donahue |
| 2009/0126369 A1 | 5/2009 | Walitzki et al. |
| 2009/0152970 A1 | 6/2009 | Lee |
| 2009/0186535 A1 | 7/2009 | Sullivan |
| 2010/0001531 A1 | 1/2010 | Kulde |
| 2011/0031043 A1 | 2/2011 | Armani et al. |
| 2012/0055148 A1 | 3/2012 | Leonard |

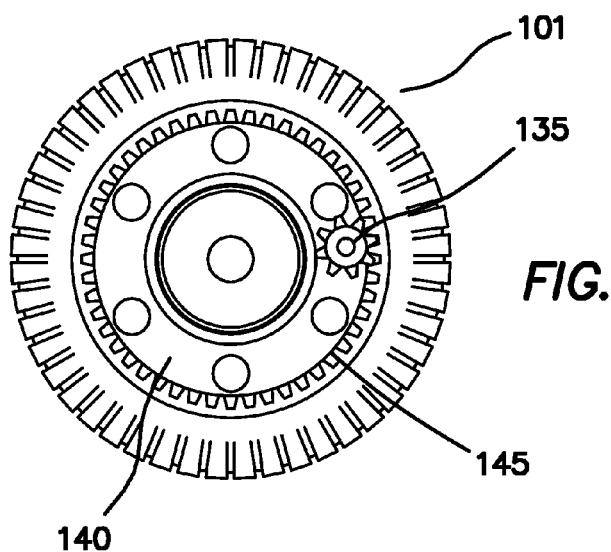
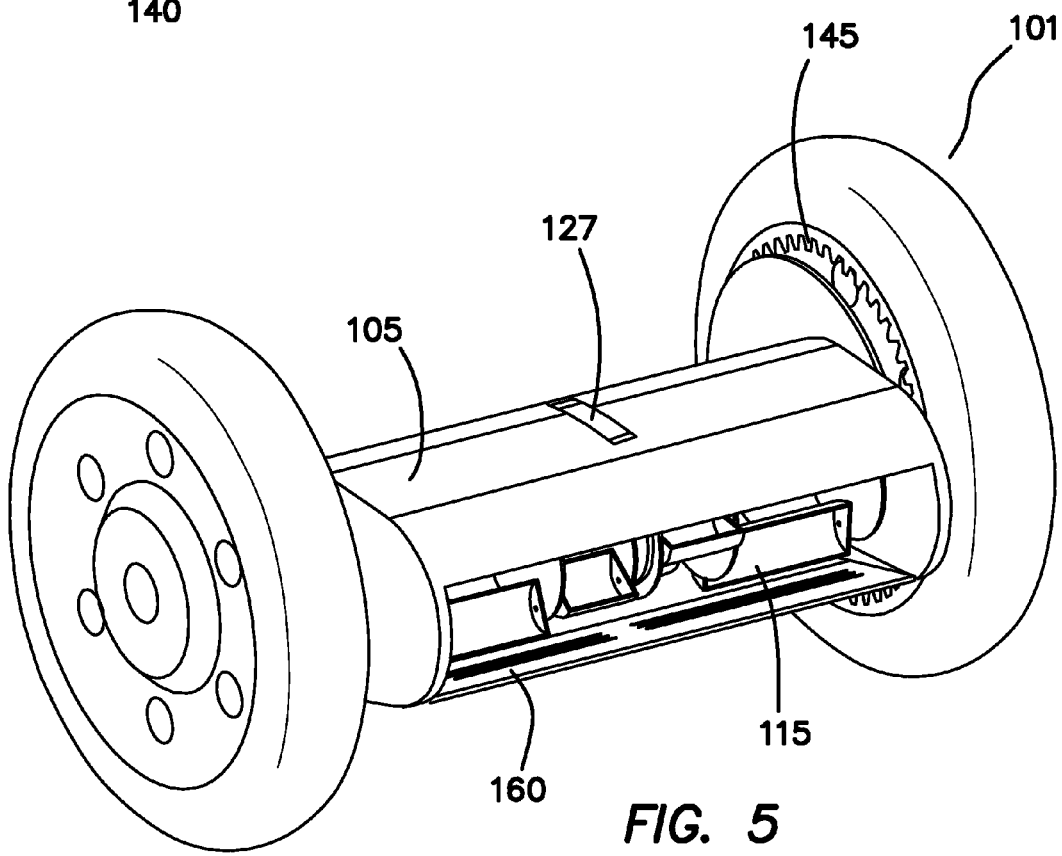

US 8,469,123 B1

ELECTRIC VEHICLE WITH ENERGY PRODUCING SYSTEM AND METHOD OF USING THE SAME

CROSS REFERENCE

This application is a divisional application of U.S. application Ser. No. 13/325,336 filed Dec. 14, 2011.

FIELD OF THE INVENTION

The embodiments of the present invention relate to an electric vehicle equipped with an energy-producing system for producing energy for use to recharge batteries powering the electric vehicle.

BACKGROUND

For many years, electric vehicles have been discussed as the possible solution to the United States' (and other countries') dependence on oil. However, one concern, among many, related to electric vehicles is the short battery life. Short battery life means that electric vehicles are limited to short vehicle trips between charges.

Accordingly, there is a need for extending the battery life associated with electric vehicles. Advantageously, the system of extending the battery life should be self-facilitating.

SUMMARY

The embodiments of the present invention relate to an energy-producing system comprising an axle configured to be driven by the vehicle's wheels when in motion. The axle supports a series of wind-catching cups contained within an aerodynamic housing configured to direct air to the cups while also increasing the air speed. During vehicle motion, the cups are acted upon by rushing air causing the rotation of the axle such that the rotation may be transferred into energy via a generator/alternator linked thereto. A series of similarly polarized magnets integrated on said cups and proximate thereto further maintain the axle in motion during intermittent vehicle stops.

The system according to the embodiments of the present invention directs the generated energy into the batteries used to drive the vehicle. In this manner, the life of the batteries between charges is increased as is the distance the vehicle can travel between charges. The system may be fabricated with an electric vehicle or added after market.

Other variations, embodiments and features of the present invention will become evident from the following detailed description, drawings and claims.

BRIEF DESCRIPTION OF THE DRAWINGS

FIG. 4 illustrates a view of an inner wheel and pinion according to the embodiments of the present invention;

FIG. 5 illustrates a partially transparent perspective view according to the embodiments of the present invention;

DETAILED DESCRIPTION

Figure 1A:
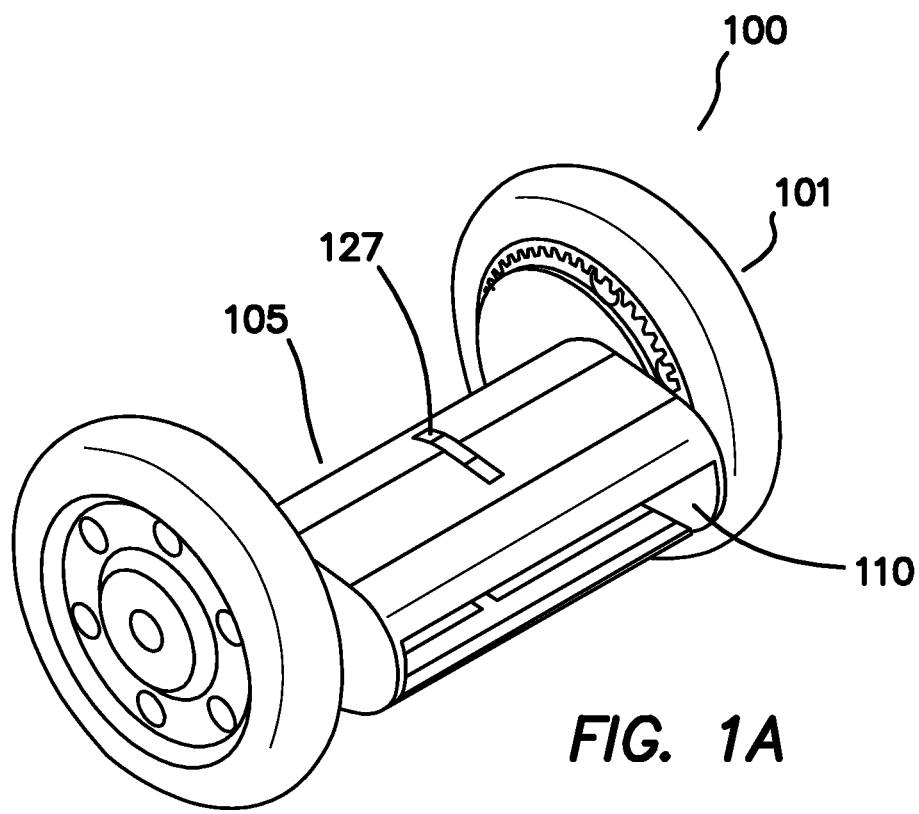
FIGS. 1A-1D illustrates perspective, top, front and rear views, respectively, of a system according to the embodiments of the present invention.
Figure 1B:
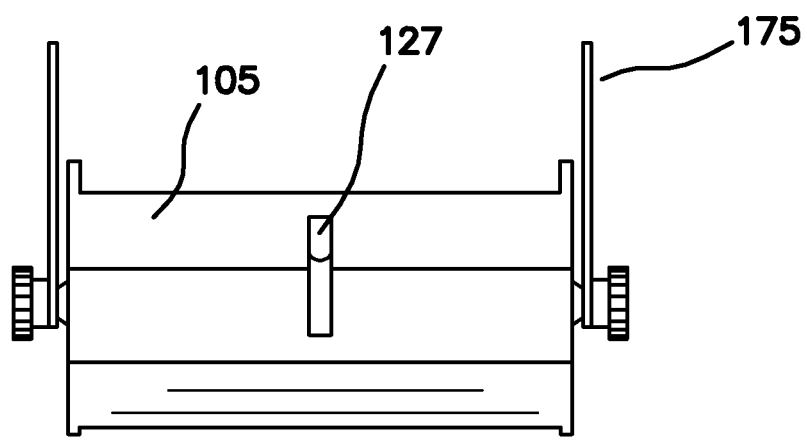
Figure 1C:
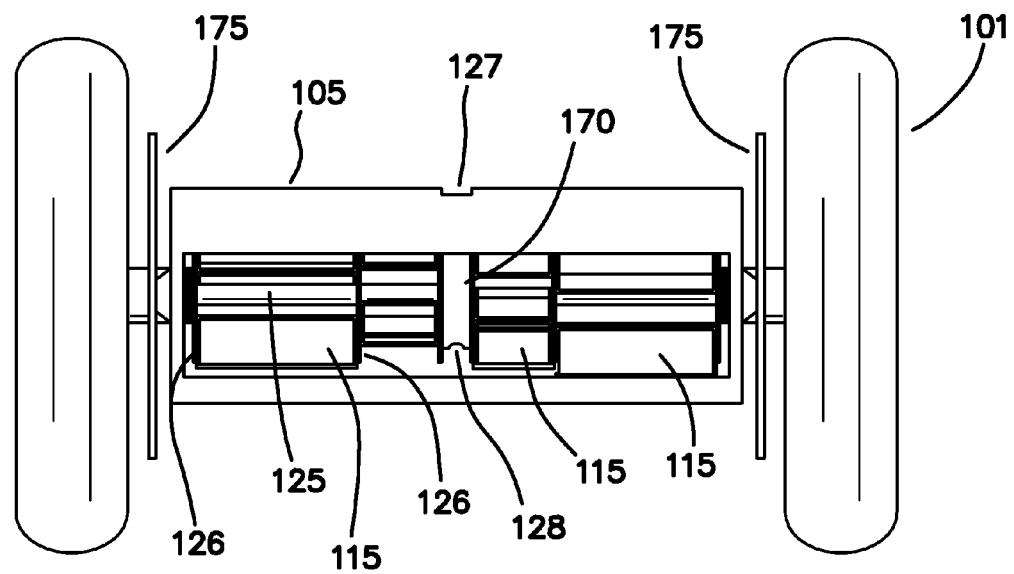
Figure 1D:
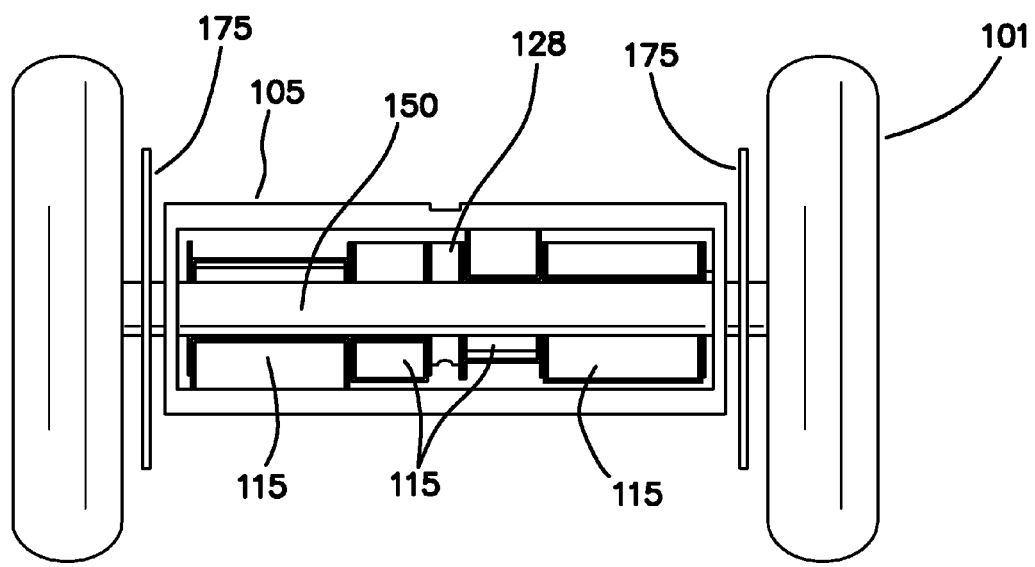

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

The embodiments of the present invention involve a system for generating energy useable to maintain the battery charge associated with the electric vehicle. The components making up the system may be fabricated of any suitable materials, including metals, alloys, composites, plastics and combinations thereof. The components of the system may be created using technologies which include machining, molding, rapid prototyping, casting, etc. The system described herein utilizes multiple features to generate energy for charging electric batteries to drive an associated vehicle.

FIGS. 1A-1D show perspective, top, front and rear views of an energy-generating system 100 according to the embodiments of the present invention. A housing 105 is configured with a front opening 110 to capture and direct rushing air towards cups 115 configured to capture air. The housing 105 also protects the contained components from damage. From front to back, the opening 110 may be tapered (wide to thin) to increase air velocity therethrough thus increasing the energy output of the system 100 as described below. In one embodiment, the system 100 is mounted in an offset relationship to a wheel axle 150 out of the way of any drive train mechanisms associated with the vehicle. In one embodiment, the axle 150 of the vehicle inserts through oppositely positioned openings 120 in the housing 105 and openings 176 in cover plates 175 with ends inserting into vehicle wheels 101. As described below, the axle 150 rotates within said openings 120, 176 such that the housing 105 remains stationary. A system axle 125 inserts through a second pair of oppositely positioned openings 130 in the housing 105 and openings 121 in a cover plate 175 proximate each vehicle wheel 101 and extends generally parallel to said axle 150. At each end, the system axle 125 joins pinions 135 (See FIG. 4) in communication with a vehicle's wheel rim 140 having gear teeth 145 configured to receive the pinions 135 to drive the system axle 125 while the pinions 135 remain stationary relative to the wheel rim 140. While not shown, the system axle 125 may include a U-Joint to accommodate rough terrain.

Figure 2:
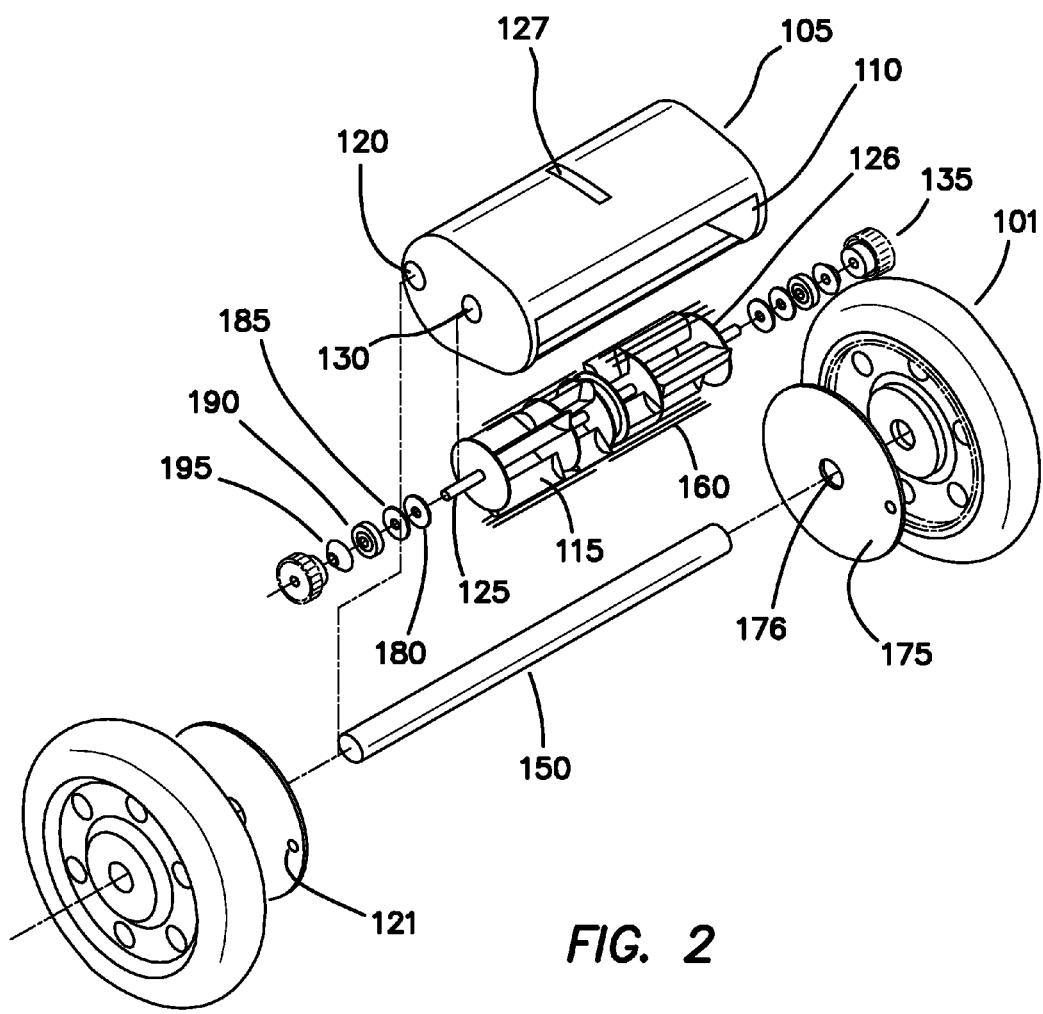
FIG. 2 illustrates a perspective, exploded view of the system according to the embodiments of the present invention.
Figure 3:
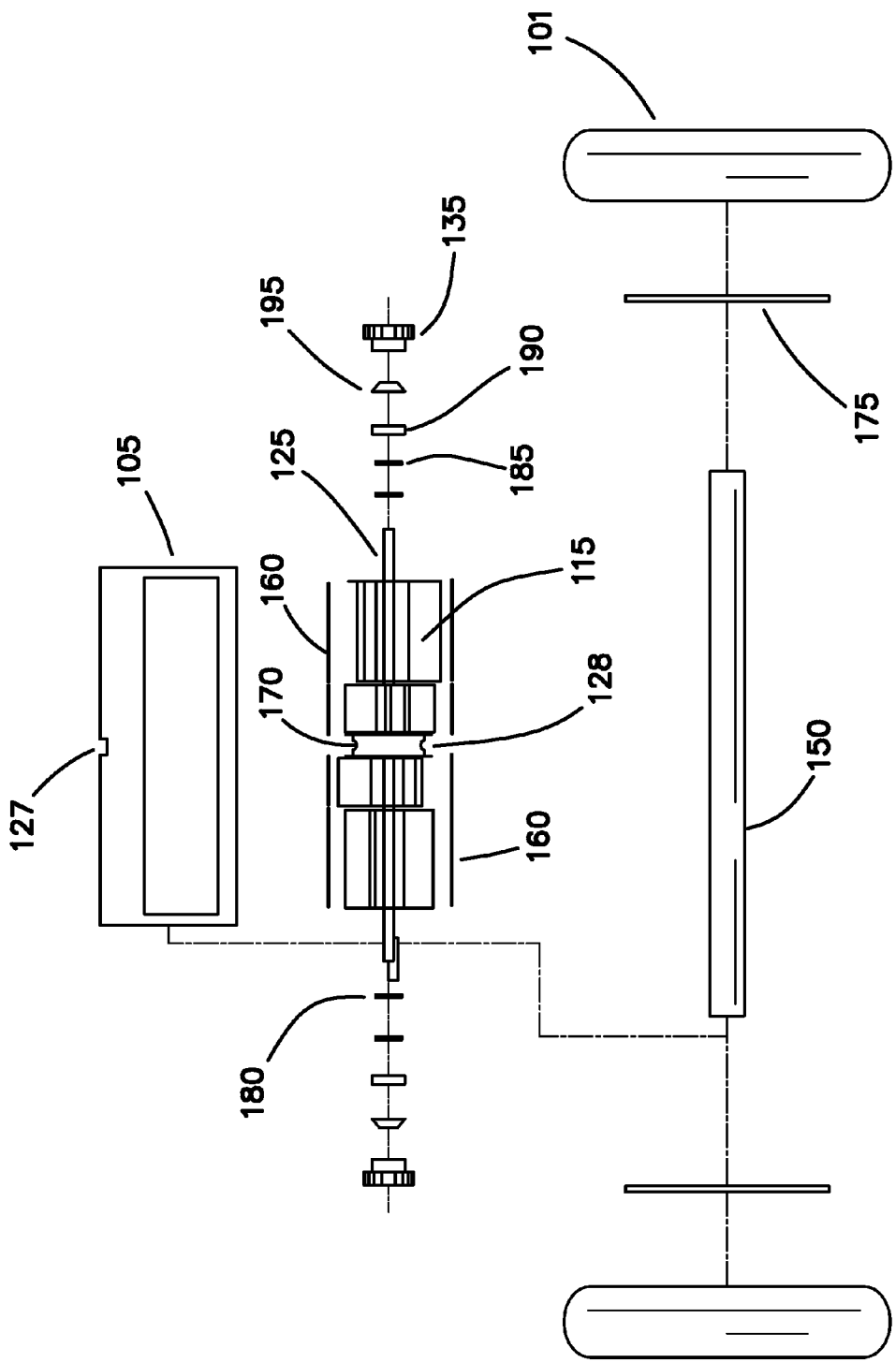
FIG. 3 illustrates a front, exploded view of the system according to the embodiments of the present invention.

FIGS. 2 and 3 show exploded perspective and front views of the system 100 according to the embodiments of the present invention. The system 100 broadly comprises the housing 105, system axle 125, cups 115 supported by the system axle 125, a first set of magnetic strips 155 attached to said cups 115, a second set of magnetic strips 160 positioned on the housing 105 proximate to said first set of magnetic strips 155 on the housing 105, pulley 170 configured to drive a belt, chain or similar mechanisms able to drive a generator/alternator 108 (shown in FIG. 9), cover plates 175 and pinions 135. Other system items include ratchet pawls 180, dust washers 185, axle bearings 190 and ball cups 195.

Figure 6:
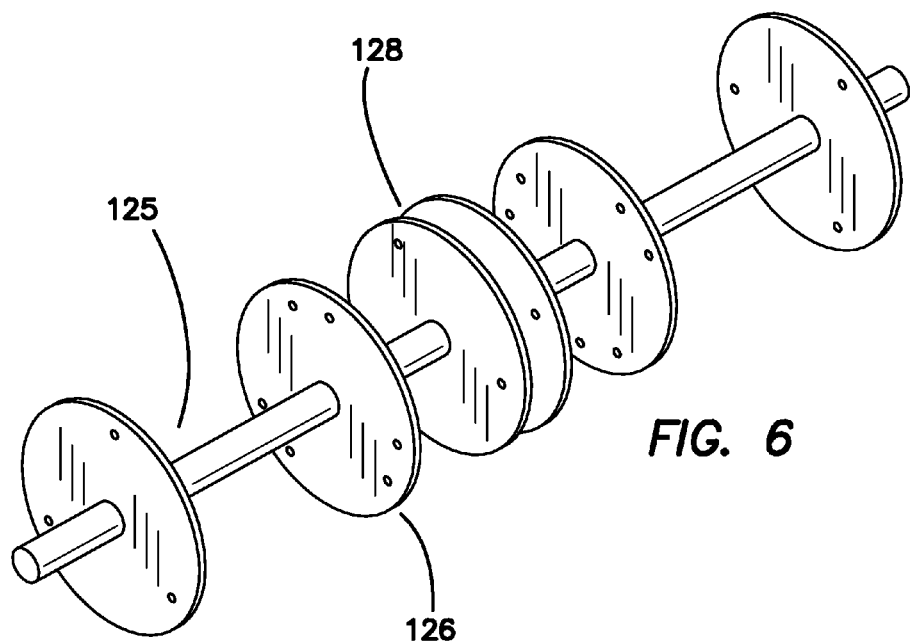
FIG. 6 illustrates a perspective view of a primary axle according to the embodiments of the present invention.
Figure 8:
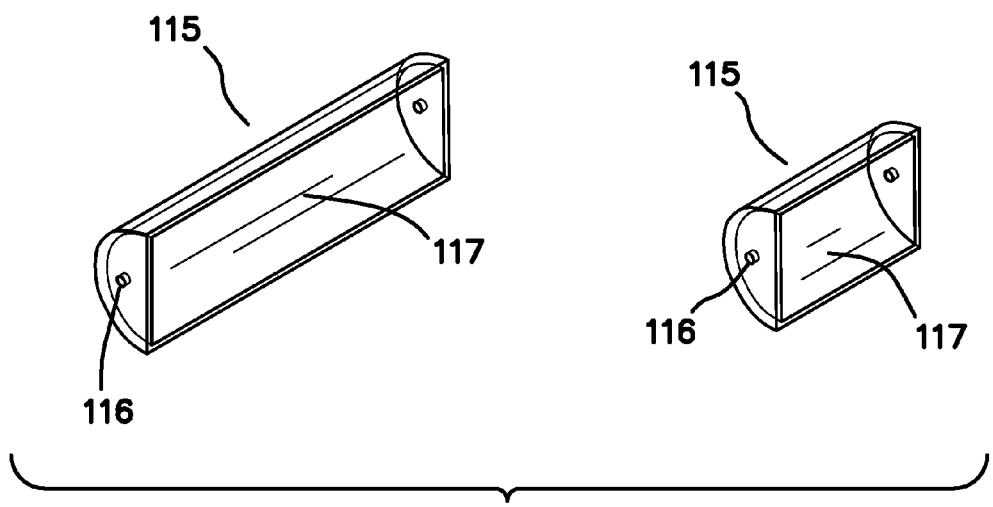
FIG. 8 illustrates cups of the type associated with the system according to the embodiments of the present invention.

As best shown in FIG. 6, the system axle 125 includes a series of spacers 126 in-between which the cups 115 are attached. In one embodiment, the cups 115 are attached at each end to the spacers 126. As seen in FIG. 8, the attachment may be facilitated by pins 116 extending from ends of the cups 115 wherein said pins 116 are positioned to insert into openings in said spacers 126. Other connection means such as screws, rivets, adhesives, magnets may be used as well. A space 128 between two center spacers is configured for receipt of a belt, chain, strap or similar article 107 capable of driving a generator and/or alternator 108 attached thereto. The space 128 accommodates a pulley 170. In this manner, as the axle 125 rotates, the belt 107 drives the generator/alternator 108 to transform mechanical energy into electrical energy for storage in the vehicle's electric batteries 205. An opening 127 in the housing 105 accommodates the passage of the belt, chain, strap or similar article which connects the axle 125 to the generator/alternator 108 allowing the rotation of the axle 125 to drive the generator/alternator 108.

The first set of magnetic strips 155 attached to said cups 115 work along with the second set of magnetic strips 160 positioned proximate thereto. In one embodiment, the second set of magnetic strips 160 act to repel and/or attract the first set of magnetic strips attached to said cups 115 thus urging the cups 115 to move. In one embodiment, the second set of magnetic strips 160 are attached to upper and lower inner surfaces of the housing 105 in proximity to the edges of the cups 115 as shown in FIG. 5. In this manner, the cups 115 with the first set of magnet strips 155 on edges thereof tend to continue moving as the second set of magnetic strips 160 positioned proximate thereto repel and/or attract the magnetic strips 155 on the edges of the cups 115. Such an arrangement maintains the axle 125 in motion during periods when the vehicle is at rest (i.e., at a stop sign or light). Such continuous motion causes less energy to be used to re-start the rotation of the axle 125 and causes the generator/alternator 108 to continue to transfer mechanical energy into electrical energy.

Figure 7:
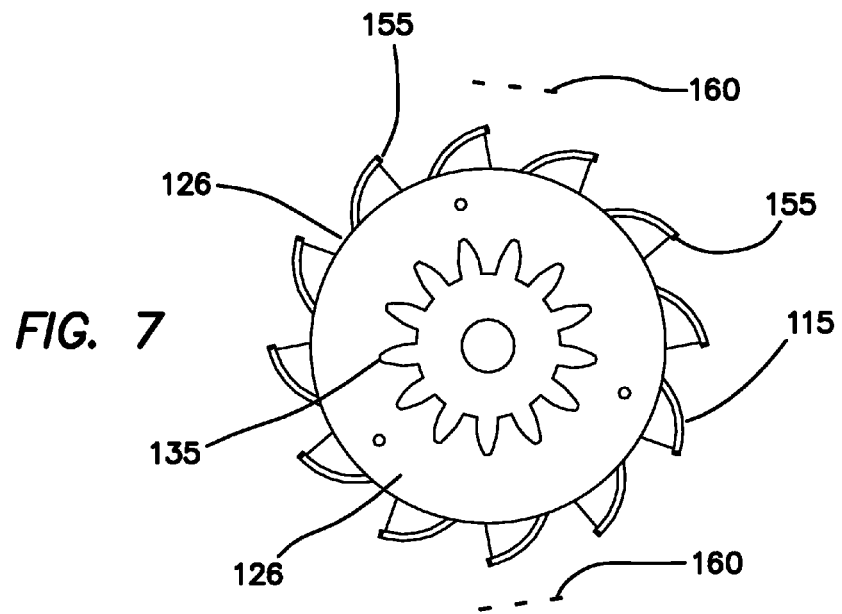
FIG. 7 illustrates a side view of the system according to the embodiments of the present invention.

The cups 115, as shown in FIG. 8, can take on various sizes (e.g., short or long) and shapes. The cups 115 include a defined cavity 117 configured to capture rushing air entering the front opening 110 of the housing 105. FIG. 7 shows twelve cups 115 attached to the axle 125 between one set of spacers 126. It is understood that more or less cups 115 may be attached to the axle 125 between spacers 126. FIG. 7 shows the pinion 135, cover plate 175, first set of magnetic strips 155 and second set of magnetic strips 160. As referenced above, in one embodiment, the housing 105 is mounted rear of the vehicle's drive system on a rear axle. To accomplish the rear mount, the pinions 135 are positioned in opposite rims 140 rear of the drive axle 150. Other mount positions are conceivable as well.

Figure 9:
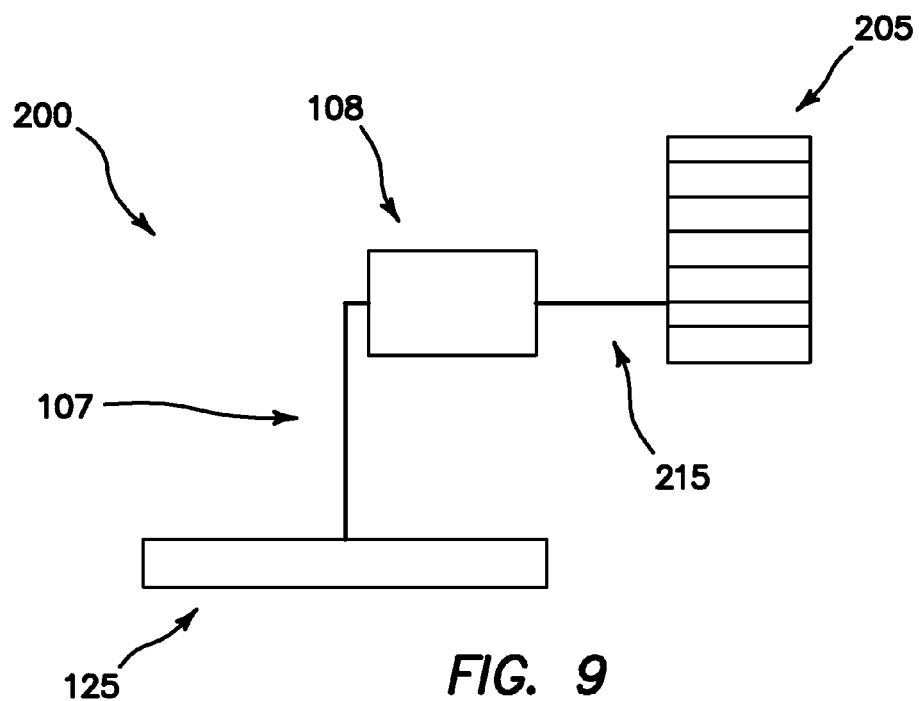
FIG. 9 illustrates a block diagram of a system according to the embodiments of the present invention.

FIG. 9 shows a block diagram 200 detailing the broad aspects of the system 100 and one method for transferring mechanical energy to electrical energy for storage in the vehicle's batteries 205. The system 100 broadly comprises the system axle 125 driven by the system components as described above. A belt 107 (or similar article) is driven by system axle 125 and thereby drives a generator/alternator 108. The generator/alternator 108 may be any suitable generator/alternator 108 configured to transform rotational/mechanical energy into electrical energy. An electrical conduit 215 transfers the electrical energy output of the generator/alternator 108 to the vehicle's batteries 205 which receive the electrical energy for current use or stores the electrical energy for later use.

In another embodiment, the system 100 may be used as a source of electricity for a home site or camp ground. In such an embodiment, the drive wheels of the vehicle are elevated to prevent the vehicle from moving. Belts over slightly deflated drive wheels are used to drive one or more generators while the vehicle's accelerator is depressed using suitable means therefore. The output of the one or more generators may then be used to provide electricity to a camp site or house or RV.

Although the invention has been described in detail with reference to several embodiments, additional variations and modifications exist within the scope and spirit of the invention as described and defined in the following claims.

I claim:

1. A system for use with a vehicle comprising:
a housing;
an axle;
multiple spacers positioned along said axle;
one or more cups attached to said spacers and configured to capture air moving through an opening in said housing to rotationally drive said axle;
a first set of magnets attached to said cups;
a second set of magnets attached to said housing in proximity to said cups, said first and second set of magnets having the same polarity;
means for connecting said axle to wheels of a vehicle such that said axle is driven by movement of said wheels; and
a belt for transferring rotational energy from said axle to a generator.

2. The system of claim 1 wherein said housing includes an opening for passage of said means for driving a generator.

3. The system of claim 1 wherein said first set of magnets is attached to edges of said cups.

4. The system of claim 1 wherein said second set of magnets is attached to upper and lower, inner surfaces of said housing.

5. The system of claim 1 further comprising a pair of cover plates.

6. The system of claim 1 wherein said means for connecting said axle to wheels of a vehicle such that said axle is driven by movement of said wheels comprises:
a pair of pinions, one at each end of said axle, including perimeter teeth, said perimeter teeth configured to mate with a gear member integrated with rims of said wheels.

7. A system for use with a vehicle comprising:
a housing with two pairs of openings on sides thereof, one of said two pairs of openings of said housing configured to accommodate a vehicle axle;
a system axle extending through one of said two pairs of openings on sides of said housing;
multiple spacers positioned along said system axle;
one or more cups attached to said spacers and configured to capture air moving through an opening in said housing to rotationally drive said system axle;
means for connecting said system axle to wheels of a vehicle such that said system axle is driven by rotation of said wheels; and
a belt for transferring rotational energy from said axle to a generator.

8. The system of claim 7 further comprising (i) a first set of magnets attached to said cups; and (ii) a second set of magnets attached to said housing in proximity to said cups, said first and second set of magnets having the same polarity.

* * * * *